United States Patent [19]
Harada

[11] Patent Number: 4,483,609
[45] Date of Patent: Nov. 20, 1984

[54] ILLUMINATION DEVICE FOR A COPYING MACHINE

[75] Inventor: Masaaki Harada, Kanagawa, Japan

[73] Assignee: Fuji Xerox Co., Ltd., Tokyo, Japan

[21] Appl. No.: 347,388

[22] Filed: Feb. 9, 1982

[30] Foreign Application Priority Data

Mar. 30, 1981 [JP] Japan .................................. 56-45578

[51] Int. Cl.³ ...................... G03G 15/00; G03B 27/54
[52] U.S. Cl. ......................................... 355/11; 355/67
[58] Field of Search ....................... 355/11, 65, 66, 67; 362/3, 12, 217, 297, 301

[56] References Cited

U.S. PATENT DOCUMENTS

| 3,977,784 | 8/1976 | Hara | 355/67 |
| 3,982,116 | 9/1976 | Sakuma | 355/67 X |
| 4,239,383 | 12/1980 | Peterson | 355/67 |
| 4,295,186 | 10/1981 | Sugiura et al. | 355/67 X |

FOREIGN PATENT DOCUMENTS 2034488 6/1980 United Kingdom .................. 355/67

OTHER PUBLICATIONS

IBM Technical Disclosure Bulletin, "Illumination to Eliminate Shadows", Bersot et al., vol. 15, No. 2, Jul. 1972, p. 521.

Primary Examiner—John F. Gonzales
Assistant Examiner—J. Pendegrass
Attorney, Agent, or Firm—Sughrue, Mion, Zinn, Macpeak, and Seas

[57] ABSTRACT

The device for illuminating an original document in a copying machine in which the original document is properly illuminated both when it is in contact with a platen and when it floats above the platen. A main reflector is disposed around a light source to produce an arc of illumination directed toward the platen. A primary reflector disposed within the periphery of the arc reflects a first beam toward the platen while a floating-original reflector, also disposed within the periphery of the arc, reflects a second beam of light toward the platen in a direction so as to illuminate the original document within a predetermined range of distance from the platen.

5 Claims, 9 Drawing Figures

ILLUMINATION DEVICE FOR A COPYING MACHINE

BACKGROUND OF THE INVENTION

The present invention relates to a device for illuminating an original document or image (hereinafter referred to as an "original") for a copying machine or the like, having an image forming optical system such as a "selfoc" lens which has a small image formation width.

In a conventional original illuminating device for an electronic copying machine or the like, as shown in FIGS. 1 and 2, a main reflector b and an auxiliary reflector c (FIG. 1) or an opposed reflector d (FIG. 2) are provided about a light source 1 at positions such that light from the light source a is condensed on an original mounted on a platen g. The configuration produces a lens image formation width f for an image forming optical system e, which may, for instance, be a "selfoc" lens. However, these conventional configurations are accompanied by a rather serious drawback in that, when the lens image formation width f is reduced, for instance, to 5 mm or less, an unwanted shadow will be present if the original starts to "float" over the platen; that is, to separate from the platen. In order to eliminate this effect produced by floatation of the original, prior art illumination systems have been proposed which provide an increased light condensation width, in excess of that required for a normal copying operation. However, this increased condensation width is accompanied by a great reduction in the overall illumination efficiency, as shown by the dashed line graph of FIG. 3.

SUMMARY OF THE INVENTION

Accordingly, an object of this invention is to eliminate the above-mentioned deficiencies inherent in conventional original illuminating devices. More specifically, an object of this invention is to provide an original illuminating device for a copying machine, in which a reflector for a floating original is added and the light condensation position is set to the position of a floating original. This configuration eliminates the adverse effects caused by the floatation of an original, preventing the formation of unwanted shadows on copies.

DESCRIPTION OF THE PREFERRED EMBODIMENTS

Figure 4:
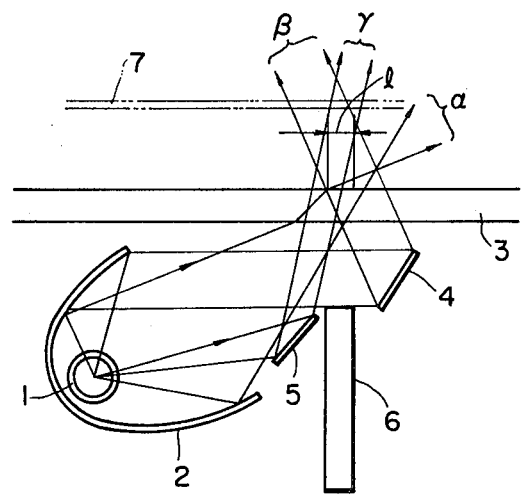
FIG. 4 is a diagram showing the structure of a preferred embodiment of an original illumination device of the present invention.

In the original illumination device of the invention shown in FIG. 4, a light source 1 is implemented with an incandescent lamp such as a linear halogen lamp. The light source 1 is provided with a main reflector 2 which is disposed about the light source 1 and shaped and positioned such that light from the light source 1 is reflected towards the platen 3 above the light source 1. An opposed reflector 4 and a reflector 5 for a floating original are both disposed inside the periphery of the arc of illumination produced by the light source 1 and the main reflector 2. The opposed reflector 4 reflects light from the light source 1 towards the platen 3, forming a parallel illumination light beam $\beta$.

The floating-original reflector 5 also reflects light from the light source 1 towards the platen 3, forming a parallel irradiation light beam $\gamma$. When the original 7 floats above the platen 3, it is also illuminated with an illumination with 1 corresponding to the lens image formation width of an image forming optical system 6, which may be a "selfoc" lens, at the position at which the original 7 floats.

Figure 1:
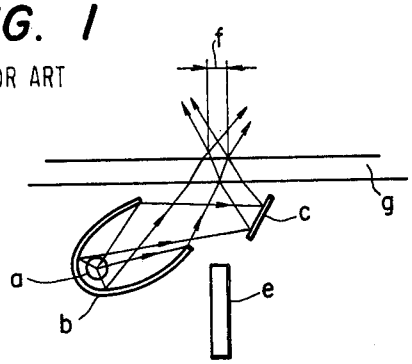
FIGS. 1 and 2 are diagrams illustrating the structure and operation of conventional original illumination devices.
Figure 2:
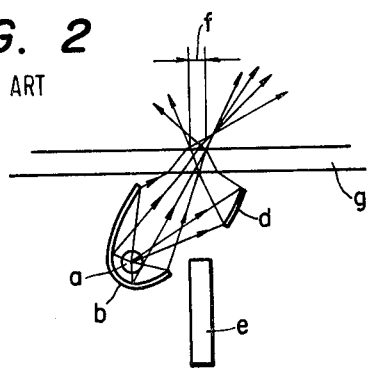
Figure 3:
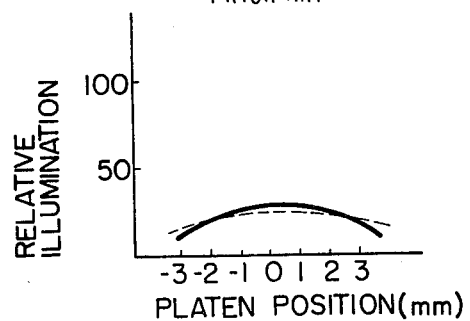
FIG. 3 is a graph of the illumination efficiency of the prior art illumination devices of FIGS. 1 and 2.
Figure 5A:
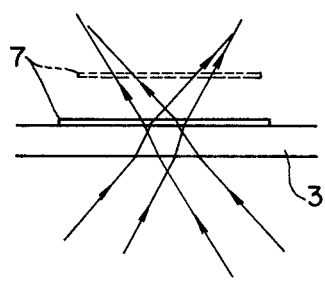
FIG. 5A is a diagram showing the platen illumination produced by the prior art device configurations.
Figure 5B:
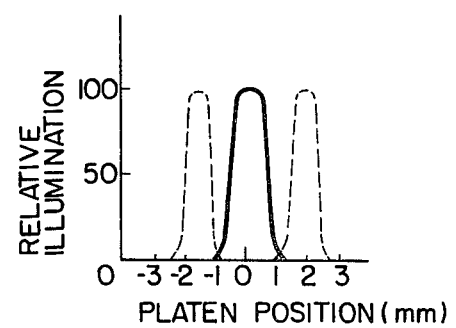
FIG. 5B is a graph of the illumination about the center of the platen produced by the prior art devices.

When the original 7 floats as indicated by the dashed line in FIG. 5A, with a conventional illuminating device such as that shown in FIG. 1, the relative illumination of the platen 3 is reduced at the central portion of the platen. Such prior art configurations thereby produce a shadow about the center of the platen, as illustrated by the dashed line of FIG. 5B. The solid line graph of FIG. 5B illustrates the ideal illumination peformance that is possible with such configurations.

Figure 6A:
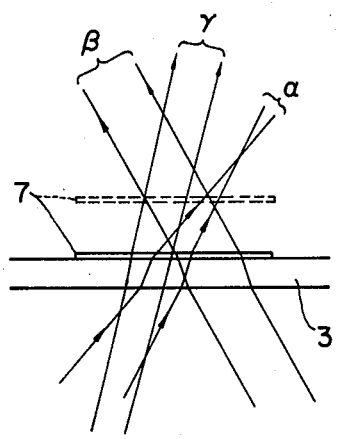
FIG. 6A is a diagram of the platen illumination produced by a device of the present invention.
Figure 6B:
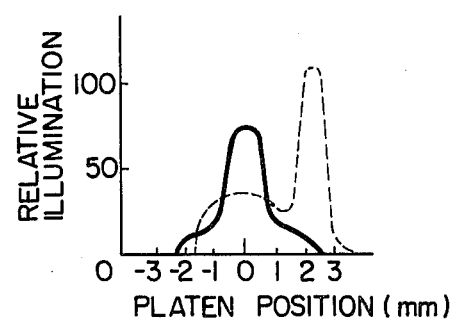
FIG. 6B is a graph of the illumination about the center of the platen produced by a device of the present invention.
Figure 7:
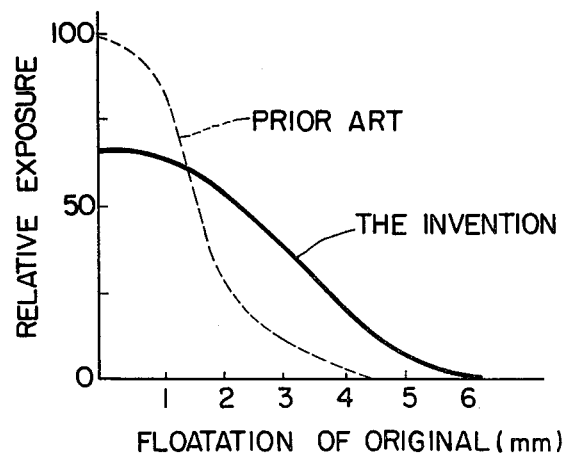
FIG. 7 is a comparison graph of the relative illumination produced by prior art devices and by the present invention.

With an illuminating device according to the present invention, when the original 7 floats as indicated by the broken line of FIG. 6A, the relative illumination of the platen 3 about its center is greatly enhanced. As illustrated by the dashed line curves of FIG. 6B, the present invention results in the elimination of the aforementioned shadow about the platen center, and also results in an illumination performance which better approximates the ideal performance described by the solid line graph of FIG. 6B. Therefore, even if the image forming optical system 6 has a small image formation width, it is unnecessary to increase the light condensation width to a value which is greater than is required for normal copying operations. As shown in FIG. 7, the resulting amount of relative exposure with respect to the floating original 7 is greater than the prior art configurations which employ a larger light condensation width.

It is preferable that the floating-original reflector 5 be disposed so as to cover floatation motion of the original ranging from about 3 to 7 mm.

As is apparent from the above detailed description, in addition to the reflector which illuminates the original when it is correctly placed on the platen, the floating-original reflector 5 further illuminates the original when it floats over the platen. As such, even if the light condensation width is reduced in correspondence with the lens image formation width of the image forming optical system, no shadow is formed on a floating original. Thus, it is unnecessary to increase the light condensation width more than is required for normal copying, thereby contributing to an improvement of the illumination efficiency.

I claim:

1. An illumination device for a copying machine comprising:

an image formation optical system;

a light source and a main reflector disposed about said light source and producing an arc of illumination directed toward a platen of said copying machine at a first angle relative to a plane perpendicular to said platen at a line image formation line on said platen;

a primary reflector disposed within the periphery of said arc of illumination and reflecting a first parallel beam of light toward said platen at a second angle, opposite in sign to said first angle, relative to said plane perpendicular to said platen;

a floating-original reflector disposed within said periphery of said arc of illumination, outside said main reflector, and reflecting a second parallel beam of light toward said platen at a third angle, significantly smaller than said first and second angles, relative to said plane perpendicular to said platen, said floating-original reflector being disposed between said image formation optical system and said main reflector at a position such that said second beam of light is directed to a position of an original floating within a predetermined range of distance from said platen.

2. The illumination device of claim 1, wherein said image formation optical system has an image formation width no greater than 5 mm.

3. The illumination device of claim 1, wherein said range of distance of floatation of said original is 3 mm to 7 mm.

4. The illumination device of claim 1, wherein both said primary reflector and said floating-original reflector are flat reflectors.

5. The illuminating device as in claim 1, wherein said beams of light both from said primary reflector and said floating-original reflector are of substantially parallel light.

* * * * *